May 1, 1934.  R. R. ROEMER  1,956,835
SAWING MACHINE
Filed April 23, 1931  4 Sheets-Sheet 2

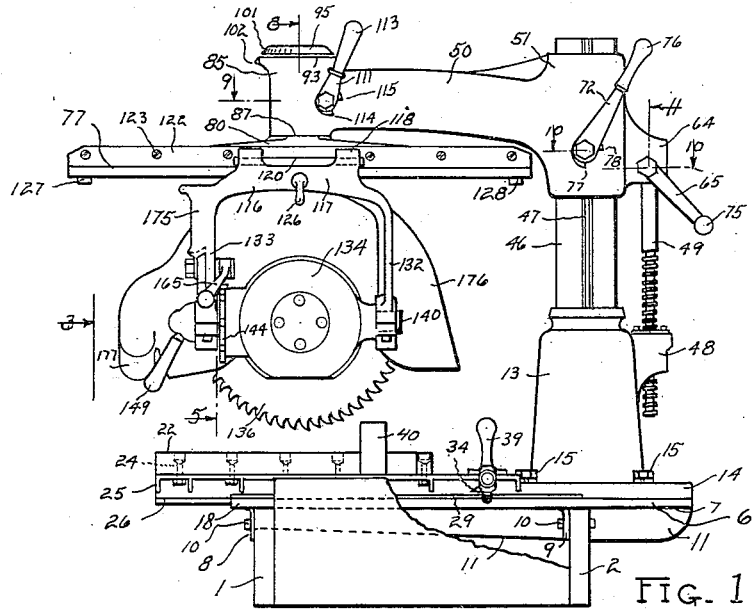

Inventor
Ralph R. Roemer.
By Slough and Canfield
Attorney

May 1, 1934.  R. R. ROEMER  1,956,835
SAWING MACHINE
Filed April 23, 1931  4 Sheets-Sheet 3
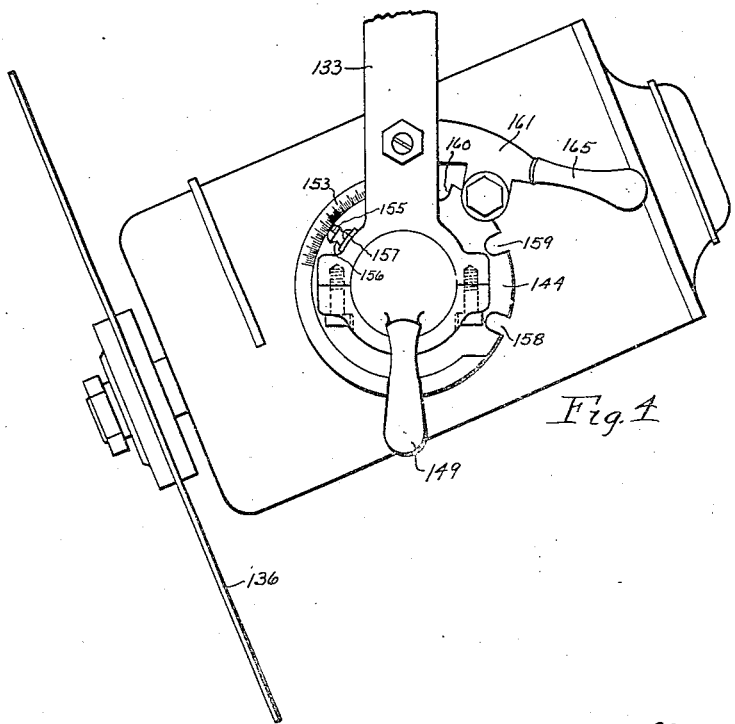
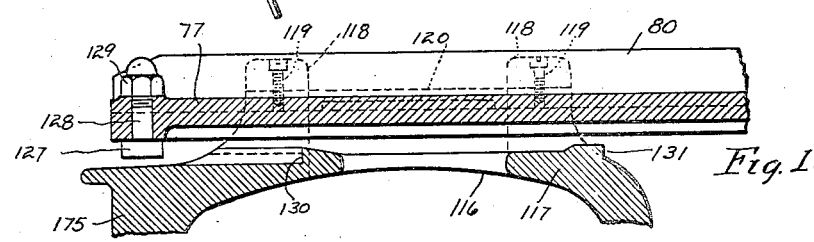
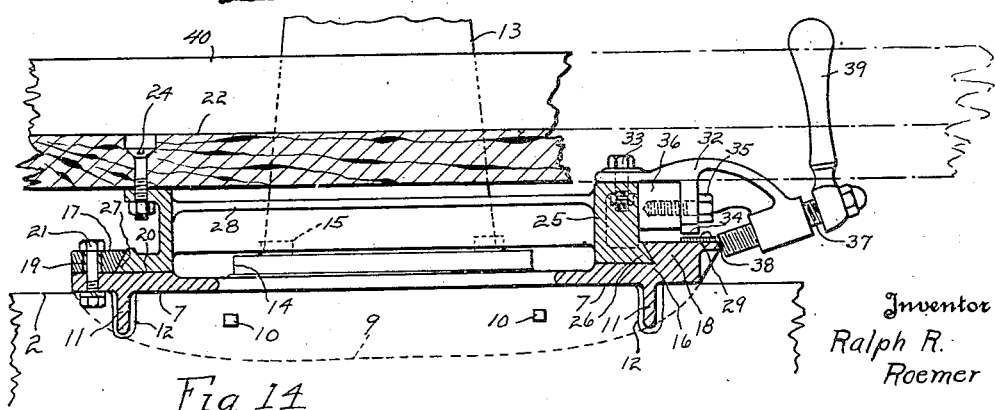
Inventor
Ralph R. Roemer
By Sleugh and Caufield
Attorney May 1, 1934.  R. R. ROEMER  1,956,835
SAWING MACHINE
Filed April 23, 1931    4 Sheets-Sheet 4
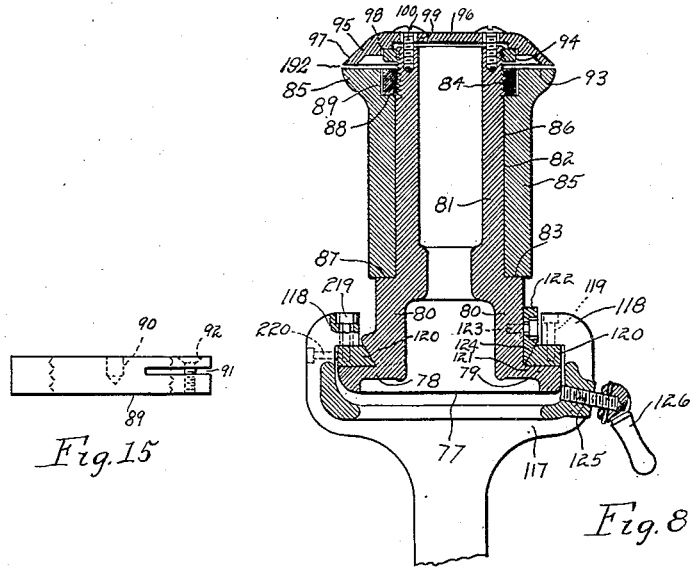
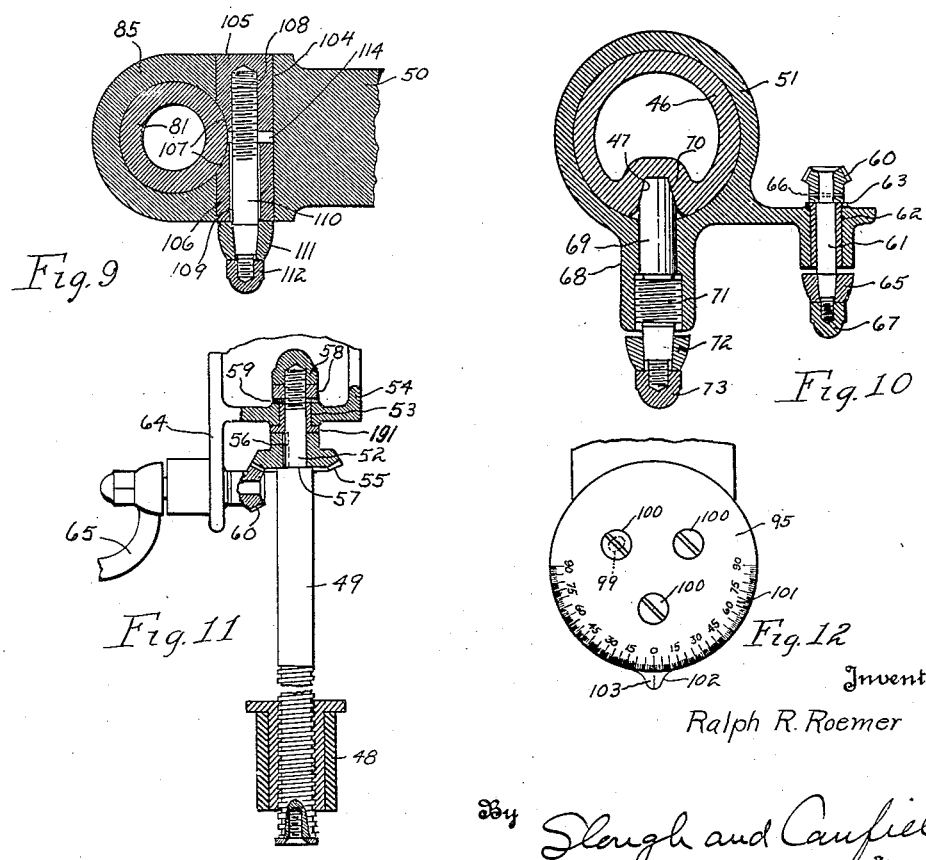
Inventor
Ralph R. Roemer
By Slough and Canfield
Attorney Patented May 1, 1934

1,956,835

UNITED STATES PATENT OFFICE 1,956,835

SAWING MACHINE

Ralph R. Roemer, Cleveland, Ohio

Application April 23, 1931, Serial No. 532,209

18 Claims. (Cl. 143—6)

This invention relates to sawing machines.

It is one of the objects of this invention to provide an improved sawing machine for sawing wood, composition material, metal, tile, marble, and other materials.

Another object is to provide a sawing machine which may be operated in an improved manner.

Another object is to provide an improved sawing machine in which a saw blade such as a circular saw, may be moved with a reciprocatory movement in the plane of the blade to perform the sawing operation in an improved manner.

Another object is to provide a sawing machine of the class referred to in which a circular or other saw blade may be adjusted to various angular positions with respect to the work to be sawed in an improved manner.

Another object is to provide a sawing machine provided with a saw reciprocable relative to the work to be operated upon and adjustable to various angular positions relative to the work and in which the adjustments may be accurately determined and the parts rigidly locked in adjusted positions in an improved manner.

Another object is to provide a sawing machine having an improved work supporting table adjustably movable in an improved manner to position the work relative to the saw.

Another object is to provide in a sawing machine an improved table for supporting work to be operated upon which may be easily and conveniently moved and accurately positioned relative to the saw and rigidly locked in any adjusted position.

Another object is to provide a sawing machine of the class referred to having various improved adjustment and indicating means for positioning the saw and the work relative to each other and improved locking means for locking the said adjustments, the indicating means and the controls for the locking means being disposed conveniently to the hands and eyes of the operator.

Another object is to provide an improved sawing machine of the class referred to constructed to permit of accurate relative disposition of the parts and comprising a motor-driven circular saw mounted for substantially universal movement to position it in predetermined positions relative to the work, and comprising means for accurately setting the saw in said positions and for rigidly locking it therein, whereby operations of great variety and scope may be performed to a high degree of accuracy.

Other objects will be apparent to those skilled in the art to which my invention appertains.

My invention is fully disclosed in the following description taken in connection with the accompanying drawings, in which:

Fig. 1 is a side elevational view of a sawing machine embodying my invention;

Fig. 2 is a top plan view of the machine of Fig. 1, with some of the parts in different positions;

Fig. 4 is a view similar to Fig. 3 with parts thereof in different positions;

Fig. 8 is a fragmentary sectional view taken approximately from the plane 8 of Fig. 1 and drawn to a larger scale;

Fig. 9 is a fragmentary sectional view taken approximately from the plane 9 of Fig. 1 and drawn to a larger scale;

Fig. 10 is a fragmentary sectional view taken approximately from the staggered plane 10—10 of Fig. 1 and drawn to a larger scale;

Fig. 11 is a fragmentary sectional view taken approximately from the plane 11 of Fig. 1 and drawn to a larger scale;

Fig. 12 is a fragmentary view of a part of Fig. 2 drawn to a larger scale;

Fig. 13 is a fragmentary sectional view taken approximately from the plane 13 of Fig. 2 and drawn to a larger scale;

Fig. 14 is a fragmentary cross-sectional view taken approximately from the plane 14—14 of Fig. 2 and drawn to a larger scale;

Fig. 15 is an elevational view of one of the parts of Fig. 8 and drawn to a larger scale;

Figure 5:
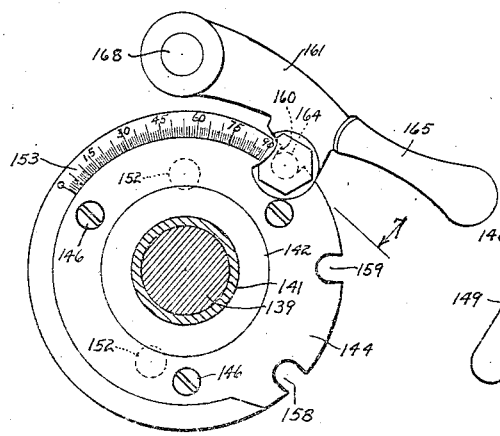
Fig. 5 is a fragmentary view taken approximately from the plane 5 of Figs. 1 or 6 and drawn to a larger scale.

My invention may be embodied in sawing machines of various types of construction but I have chosen to illustrate and describe it herein as embodied in a portable or semi-portable machine adapted to be installed for use on a bench, a pair of contractor's horses, or like elevated supports.

I have shown at 1 and 2 a pair of horizontal longitudinally disposed supporting frame members or sills and at 3—3 a pair of transverse sills, the sills 3—3 being mortised into the sills 1 and 2, as shown at 4, the sills being tied together into a rigid frame by through-bolts 5—5. The sills 1, 2 and 3 may advantageously be constructed from wood timbers. It will be understood that the sills 1 and 2 may be rested upon the supports above referred to.

Mounted upon the sills 1, 2 and 3 is a metal base 6 preferably a casting comprising preferably planular supporting portions 7—7 adapted to span and rest upon the sills 1 and 2 and adapted to be secured to the sills by means of vertically disposed front and rear flanges 8 and 9 respectively extending longitudinally of the sills 1 and 2 and bolted thereto as by bolts 10 passed through suitable perforations in the flanges and registering holes in the sills. The base 6 may also be provided with stiffening webs variously disposed transversely thereof, two of which are indicated at 11—11, and the sills may be notched out as at 12—12, Fig. 14, to clear the ribs 11 and to permit the supporting portions 7—7 of the base to rest solidly on the sills.

On the rear end of the base 6, a vertically disposed pedestal base 13 is mounted by means of a circular flange 14 and cap screws 15 extending through the flange 14 and into the base 6. The base 6 is also provided with a pair of forwardly and rearwardly extending V-shaped guideways 16 and 17 to support and guide a movable table carriage to be described. The guideway 16 is preferably formed in the material of the base 6 by cutting a V-shaped groove therein, the base for this purpose being provided with an integrally formed rail 18 into which the groove may be cut. The guideway 17 is preferably provided by an over-hanging metal guide strip 19 bolted to a flat face 20 machined on the base, by means of bolts 21. The movable table or work support referred to comprises a flat horizontal table proper 22 constructed preferably from wood, the forward and rearward dimensions of the top being preferably considerably less than the side to side dimensions. The top may be constructed of a number of timbers secured together by cleats 23—23 and is secured to the table carriage 25 as by screws 24—24 passed downwardly through the table top and into the carriage, Figs. 1 and 14.

The carriage 25 has V-shaped portions 26 and 27 adapted to fit the guideways 16 and 17 of the base 6 and thus is mounted to be slidingly moved forwardly and rearwardly in said ways, the fit of the guides 26 and 27 being both simultaneously adjustable by adjustably moving the strip 19, the bolts 21 passing through suitable holes in the strip 19 with lateral clearance in the holes for this purpose. The guides 26 and 27 of the table carriage 25 may be braced by a connecting rib or ribs 28 extending longitudinally of the machine from one guide to the other.

It will be observed that the construction above described permits of assembling the table top and table carriage together as a unit and then engaging the carriage guides 26 and 27 with the guideways 16 and 17 by a rearward movement of the carriage with respect to the ways, and the table may thereafter be propelled forwardly or rearwardly by being pushed or pulled by the hand of the operator to any desired position with respect to the base 6 for purposes to be described. To determine the position of the table and to lock it in any adjusted position, the following means is provided. A scale 29, preferably in the form of a strip of metal having thereon scale divisions, preferably in inches, is secured as by screws 31 on the rail 18 of the base. A bracket 32 is bolted as at 33 to the carriage 25 and over-hangs the scale 29, being provided with an indicating edge 34 disposed adjacent the scale marks 30. Thus upon movement of the carriage 25, the edge 34 will travel over the scale 29 and the scale may be calibrated to indicate the position of the carriage.

The bracket 32 besides being bolted to the carriage 25 by the bolts 33, is also rigidly secured thereon by an additional bolt 35 horizontally disposed and screwed into a boss 36 on the carriage; and the bracket 32 has, screw-threaded in its outer end, a stud 37 the inner end of which is adapted to engage the rail 18 of the base, as at 38, and the outer end of which is provided with a handle 39 rigidly locked thereon. By turning the handle the stud 37 may be forced against the rail 18, thus clamping the rail 18 between the guide 26 of the carriage and the end of the stud 37 effectively locking the carriage against longitudinal movement on its guideways in any of the adjusted positions of the carriage above described.

The table 22 is preferably provided with a fence 40 formed from a strip of wood, disposed along the rear side of the table and projecting above it, against which articles to be operated upon may be placed when on the table to position them. It is desired that the saw, to be described, may cut through the fence 40 in the operation thereof and the fence is therefore preferably made easily removable for renewal purposes by a wedge construction comprising a pair of stationary wedges 41—41 secured at one end as at 42 to the carriage 25 and at the other end, to the cleats 23 as at 43 and removable wedges 44—44 resting on the cleats 23 and the carriage 25 and adapted to be driven inwardly to clamp the fence 40 between the wedges 44 and the rearward edge 45 of the table.

The pedestal 13 above referred to continues upwardly in a cylindrical column 46 having in one side thereof a generally V-shaped keyway 47. On the rear side of the pedestal 13 is a screw-threaded bracket 48 with which is meshed an elevating screw 49, to be more fully described.

An arm 50 extending forwardly and over-hanging the table 22 is formed with a cylindrically bored head 51 fitting the cylindrical column 46 and adapted to be slidingly moved vertically thereon. On the rear portion of the head 51, Figs. 1, 10, and 11, means is provided to raise and lower the head 51 on the column. The screw 49 has rotational bearing at its upper end on a reduced diameter portion 52 thereof in a bearing bushing 53 mounted in a bracket 54 formed on the head 51. A bevel gear 55 is keyed to the screw 49 as at 56 and is disposed between a shoulder 57 on the screw and a flange 191 on the bushing 53. The portion 52 of the screw extends through the bushing 53 and is threaded to receive a pair of jam nuts 58 thereon, a thrust washer 59 being disposed between the bushing 53 and the nuts. Thus the screw 49 is held against longitudinal movement and the end thrust thereof is absorbed on the bracket 54 through the bushing 53, bevel gear 55, and washer 59, and these parts may be readily removed for replacement upon removing the nuts 58.

The gear 55 is meshed with a bevel pinion 60 rigidly secured on a stem 61 by a pin 66, the stem 61 having rotational bearing in a bushing 62 which has an end thrust flange 63 thereon, the bushing 62 being supported in a bracket 64 on the rear portion of the head 51. A crank handle 65 is wedgingly press-fitted on the outer end of the stem 61 by a nut 67 threaded on the stem. By the construction thus described, it will now appear that on turning the crank handle 65 by means of a handle grip 75 thereon, the meshed gears 60 and 55 will turn the screw 49 and exert force either to elevate or to depress the head 51 on the column 46.

The head 51, Figs. 2 and 10, is provided with a boss 68 extending laterally therefrom in which is reciprocable, radially of the column 46, a plunger 69 the inner end of which as at 70 is wedge-formed to fit the V-shaped keyway 47 in the column. Into the outer end of the boss 68 is screw-threaded a stud 71 on the outer end of which is wedgingly press-fitted a lever handle 72 by means of a nut 73 screw-threaded on the end of the stud 71. The lever 72 is provided with a hand grip 76.

It will now be clear that when the lever 72 is rocked in the direction to screw the stud 71 into the boss 68, the plunger 69 will be forced inwardly and the wedging engagement thereof with the keyway 47 will both rigidly lock the head 51 on the column 46 and dispose the arm 50 in a predetermined, definite, accurate position over the table 22. Also, upon rocking the lever 72 to loosen the plunger 69, the head 51 will be free to be raised and lowered on the column 46 by the screw 49 on turning the handle 65, and any slight rotational movement or displacement of the arm 50 around the axis of the column 46 will be corrected upon locking the head on the column by the lever 72 in the manner above described.

Preferably the lever 72 is rocked counter-clockwise to unlock the head 51 and to prevent the lever 72 from moving to an inconvenient position, a dog 78 on the head 51 is positioned to be engaged by a dog 77 on the lever 72 when the lever is in the unlocked position.

In the outer end of the arm 50, is supported a horizontal over-head trackway 77 comprising a pair of parallel horizontal guideways 78 and 79 extending longitudinally of the trackway, and parallel ribs 80—80, and, preferably formed integrally with the ribs and guideways, a vertically disposed stem portion 81 disposed substantially midway between the ends. The stem portion 81 is generally cylindrical and has a reduced diameter portion 82, thus providing a shoulder 83. The upper end of tne stem portion 81 is screw-threaded as at 84.

The outer end of the arm 50 is provided with a head portion 85 bored out vertically as at 86 on an axis accurately parallel with the bore in the head 51 to rotatably mount the stem portion 81, the upward position of the stem portion being determined by the shoulder 83 engaging the lower end 87 of the head 85. The stem portion 81 is held upwardly in the head 85, to support the stem portion and its associated parts in a manner to adjustably take up all lost motion endwise as follows. The upper end of the head 85 is counter-bored as at 88 and a nut 89 is seated in the counter-bore threaded on the threads 84 of the stem portion, the nut 89 having end thrust bearing in the bottom of the counterbore 88. By turning the nut 89, which is shown separately in Fig. 15, by any suitable means such as a spanner wrench hole or holes 90 in a well known manner, the stem portion 81 may be accurately adjustably positioned in the head 85 to eliminate lost motion axially, and the nut 89 may be locked on the stem portion 81 in any adjusted position in any suitable manner, as for example by the arrangement shown in Fig. 15, which comprises a transverse horizontal sawed slot 91 in one side of the nut 89 and a screw 92 for drawing together the portions of the nut on each side of the sawed slot to jam the threads of the nut adjacent the sawed slot on the threads 84 of the stem portion 81.

In the operation of the machine later to be described, the trackway 77 is rotated to selected angular positions around the axis of the stem portion 81 in the head 85 and locked in said positions by the following means. The upper termination 93 of the head 85 is finished in a plane at right angles to the rotational axis of the stem portion 81 and is formed preferably circular, and the threaded portion 84 of the stem extends upwardly out of the head 85. An annular nut 94 is threaded on the threads outwardly with respect to the head 85.

An index plate 95 having a disc-like body portion 96 and a depending conical skirt portion 97 rests on the nut 94, an annular groove 98 on the under-side of the plate 95 engaging the perimeter of the nut 94 to axially center the skirt 97 with the circular portion 93 of the head. The plate 95 is provided with a plurality, such as three, of enlarged perforations 99 through which screws 100 are projected and screw-threaded into the upper end of the stem portion 81 by means of which the index plate 95 may be clamped upon the nut 94 and the nut itself jammed upon the threads 84. The conical skirt 97 is exteriorly provided with a scale 101, Fig. 12, calibrated in degrees and the head 85 is provided with a projection 102, Figs. 1 and 12, upon which, adjacent the circular surface of the head is a reference line 103. Upon turning the stem portion 81 in the head 85, the scale 101 may be read by reference to the line 103 and the angular position of the trackway 77 thereby indicated.

The index plate 95 may be adjusted rotatably to bring the zero mark thereon coincident with the reference line 103 when the trackway 77 is in the predetermined zero position by loosening the screws 100 and rotating the index plate 95 on the nut 94 and then tightening the screws. Also, the index plate 95 may be adjustably raised and lowered to adjust to a minimum the space at 192 between the skirt 97 and head 85 to bring the degree marks of the scale 101 adjacent to the reference line 103 to facilitate accurately reading the scale, by removing the screws 100, and index plate 95 and adjustably turning the nut 94 and replacing the plate and screws.

To lock the stem portion 81 in the head 85 in any angularly set position determined by the reading of the scale 101, the following means is provided. The arm 50 is bored transversely as at 104, Fig. 9, in which bore is fitted a pair of cylindrical elements 105 and 106, each of which has on its inner end a surface 107 cylindrical around the axis of the stem portion 81 and adapted to intimately contact with the same. The element 105 is screw-threaded as at 108; the element 106 is bored as at 109 and a stud 110 extends through the bore 109 and into the threads 108 and on its outer end is wedgingly press-fitted a lever 111 by means of a nut 112 threaded on the outer end of the stud 110. The lever 111 is provided with a handle grip 113, Fig. 1. By rocking the lever 111, the stud 110 will be turned and will draw the element 105 and element 106 together, clearance being provided between them as at 114. The surfaces 107 of the elements 105 and 106 will act as wedging surfaces and jam the elements 105 and 106 between the stem portion 81 and the opposite wall of the bore 104, and the stem portion 81 will thus be jammed transversely and locked against rotation in the head 85 in the bore 82 thereof.

Preferably the lever 111 is arranged to lock the stem in the head as described upon rocking it clockwise, as viewed in Fig. 1. Upon rocking the lever 111 counter-clockwise to release the stem portion and permit the angular adjustment of the trackway 77 as above described, its rocking movement is preferably limited by means of a dog 114 on the lever 111 moving into engagement with a dog 115 on the arm 50.

A motor supporting yoke 116 is mounted to slide back and forth on the trackway 77 and comprises a head 117 disposed below the trackway 77 and provided with two pairs of hook members 118 extending around and over-hanging the guideways 78 and 79. The hook members have secured thereto by screws 119, a pair of shoes 120—120 resting upon the guideways 78 and 79. The shoes 120, extending longitudinally along the trackway 77 are transversely formed V-shape as at 124 to fit corresponding V-formed portions of the guideways 78 and 79. The V-shaped guideway 78 is preferably an integral part of the trackway 77, but the guideway 79 comprises a horizontal portion 121 and a guide rail 122 screwed to one of the ribs 80—80 by screws 123 and having a V-shape portion 124 engaging the V-shape portion of the corresponding shoe 120. The rail 122 extends substantially throughout the length of the guideway 79 and by means of enlarged perforations in the rail for the screws 123 and their heads, the rail may be shifted laterally to adjust the fit of both of the shoes 120 in a manner that will be understood.

As an alternative mode of adjusting the shoes 120—120, the construction shown in the left-hand portion of Fig. 8 may be employed. The shoe 120 is securely clamped to the adjacent hook member 118 by screws 219, only one of which is shown, and may be backed up by one or more screws 220 projected through the hook member 118. By loosening the screws 219, the shoe 120 may be shifted laterally to take up all lost motion between the trackway and the supporting yoke 116, and this shifting may be effected very accurately by turning the screw or screws 220 in one direction or the other. When the exact adjustment has been obtained, the screws 219 may be drawn up tight to prevent accidental shifting of the shoes when in use. Clearance around the head and shank of the screws 219 is provided to permit the lateral adjustment.

In the operation of the machine to be described later, it is sometimes desirable to lock the yoke 116 against sliding movement back and forth on the trackway 77 in a selected position thereon, and for this purpose a stud 125 is screw-threaded through the head 117 of the yoke, the inner end abutting upon the side of the trackway 77 and the outer end being provided with a lever or handle 126 for turning the screw. Upon turning the stud, the head 117 is forced laterally and is locked against movement on the trackway by the frictional engagement of the stud 125 with the trackway.

To prevent movement of the yoke 116 beyond predetermined limits of movement of the trackway 77, stops 127 and 128 are provided at the ends of the trackway, the stops comprising the heads of bolts 128, Fig. 13, projected vertically through the trackway 77 and secured therein by nuts 129. To engage the stops 127, shoulders 130 and 131 are formed on the head 117 of the yoke.

Figure 6:
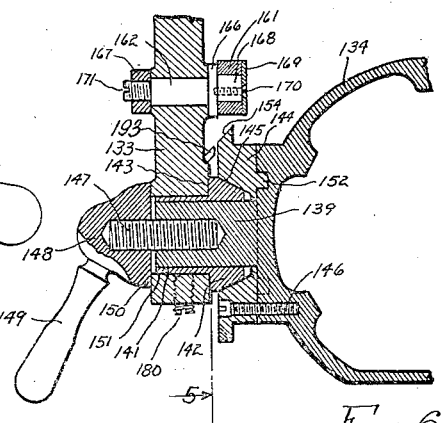
Fig. 6 is a cross-sectional view taken approximately from the plane 6 of Fig. 3 with parts behind the section plane omitted for simplicity.

Depending from the head 117 of the yoke is a pair of hangers 132 and 133 the lower ends of which are formed to provide rotational bearings for the housing 134 of an electric motor. The housing 134 is generally cylindrical, Figs. 1 to 4 inclusive and completely encloses the motor, not shown, the rotary shaft 135 of the motor extending out of the casing at one end and supporting a circular saw 136, the saw being clamped between plates 137—137 by a nut 138 on the end of the shaft. The shaft 135 is preferably the shaft of the motor rotor. The motor in the casing 134 may be of any preferred construction supplied with electric current through a cable conductor in the usual or any suitable manner, the conductor being omitted from the drawings for simplicity. The housing 134 is preferably a hollow casting, Fig. 6, and has formed thereon on a diameter thereof a pair of trunnions 139 and 140 having rotational bearing in the hangers 132 and 133. A sleeve 141 is interposed between the trunnion 139 and the hanger 133 in a bore 151 in the hanger. To lock the sleeve 141 against rotation in the hanger 133, for a purpose to be described later, a set screw 180 is threaded in the hanger 133 and engages the sleeve. The sleeve 141 is provided at its inner end with a cone-shaped head of larger diameter thus providing a shoulder 143 engaging the hanger 133. A clutch plate 144 having a female cone clutch surface 145 disposed coaxially with and fitting the cone-shaped head 142 is secured to the casing 134 by a plurality of screws 146—146. A stud 147 is axially screw-threaded into the trunnion 139 and a nut 148 provided with a handle 149 for turning it is threaded on the stud 147, the nut 148 being provided with a face 150 of larger diameter than the bearing bore 151. By the construction thus just described, upon turning the nut 148 by the handle 149, the face 150 of the nut will react upon the hanger 133 and draw the trunnion 139 toward the nut thus wedging the clutch plate 144 on the head 142 and locking the motor housing 134 against rotation on its trunnion axis. Upon loosening the nut 148, the motor housing 134 may be rocked to any desired angular position and then locked in said position.

Figure 3:
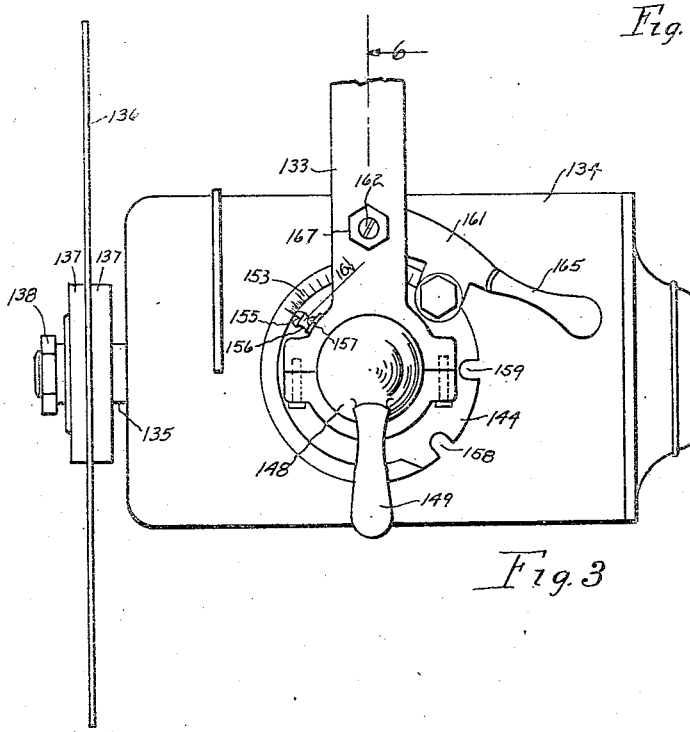
Fig. 3 is a fragmentary front elevational view of a part of the machine of Fig. 1, taken approximately from the plane 3 of Fig. 1 and drawn to a larger scale.
Figure 16:
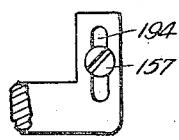
Fig. 16 is a fragmentary view taken from the plane 16 of Fig. 3 and drawn to a larger scale.

The clutch plate 144 is preferably formed as a casting and may be provided with lugs 152 fitted into recesses in the housing 134 to prevent shifting thereof on the housing, and the plate 144 may have cast or otherwise formed thereon a scale 153 calibrated in degrees whereby the said adjusted position of the casing 134 may be determined. Preferably the scale 153 is formed on a conical portion 154 of the plate 144 at the periphery thereof to render the same readily visible to an operator and a reference line 155 by which the scale may be conveniently read is formed on a pointer 156 secured as by a screw 157 to the hanger 133, Fig. 3. The portion of the pointer 156 which bears the reference line 155 being sloped as at 193, Fig. 6, to cause the line 155 to lie in the same direction as and to be in effect a continuation of the degree marks on the scale 153 to facilitate accurate reading thereof. The dispositions of the scale 153 and the pointer 156 are preferably such that the motor is in its horizontal position and the saw 136 is in a vertical plane at zero reading of the scale, as shown in Fig. 3, and by means of the scale the saw may be set in any desired angular position from the vertical position shown in Fig. 3 to a horizontal position, one of the intermediate positions being shown in Fig. 4.

Figure 7:
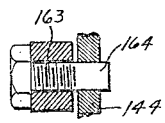
Fig. 7 is a fragmentary view taken from the plane 7 of Fig. 5.

The clutch plate 144 is furthermore provided with a plurality of indexing notches 158, 159 and 160 for positioning the saw in preselected positions independently of the scale 153. Cooperating with the notches 158 to 160 a latch lever 161 is pivotally mounted on a stud 162 in the hanger 133 and has screwed thereinto a screw 163, see Fig. 7, the end of which is unthreaded and constitutes a pin 164 adapted to fit in the notches 158 to 160.

A handle 165 is provided on the lever 161 for rocking it around its pivot bearing. Thus upon raising the handle 165 to lift the pin 164 out of the path of the notches 158 to 160, as in Fig. 4, and releasing the clutch by means of the handle 149, the saw 136 may be rocked into any desired position and the position determined by the scale 153, or the saw may be rocked until the pin 164 may be projected into one of the notches 158 to 160. The notches 158 to 160 are preferably disposed in positions coresrponding to zero degrees, 45° and 90° on the scale 153 but these positions are not essential to my invention.

In order to accurately position the plane of the saw 136 with respect to the table 22 of the machine, I provide the following means. The stud 162, Fig. 6, upon which the lever 161 is pivoted, is adjustably rotatable in a suitable bore in the hanger 133, and has a collar 166 thereon, inwardly of the hanger 133. A nut 167 threaded on the opposite end of the stud may be turned to jam the collar 166 against the hanger 133 to prevent rotation of the stud 162. The inner end portion 168 of the stud 162 is formed eccentrically of the bearing portion of the stud 162 and the lever 161 has rotational bearing on the eccentric portion 168. A plate 169 may be secured as by a screw 170 on the eccentric portion 168 whereby the lever 161 may have end thrust bearing between the plate 169 and the collar 166.

With the construction just described, the pin 164 of the lever 161 may be placed in a notch, say the notch 160, and the stud 162 may be adjustably turned by means of a screw driver slot 171 therein, thus turning the eccentric 168 and through the lever 161 and pin 164, rocking the clutch plate 144 and housing 134 and saw 136 to permit adjusting the saw to the desired plane and after the adjustment has been made, the nut 167 may be tightened to fix the same. The pointer 156 may then be adjustably moved on the hanger 133 by loosening the screw 157 which operates in a slotted hole 194 and moving the pointer to bring the reference line 155 in alignment with the zero line of the scale 153.

The sawing machine above described may be adjustably set in the various parts thereof to perform a variety of operations. With the saw 136 in a vertical plane as in Figs. 1, 2 and 3, a piece of wood or the like may be laid on the table 22 and against the fence 40 and held by one hand of the operator and with his other hand grasping a grip 175 formed on the hanger 133, he may reciprocate the yoke 116 on the trackway 77 to perform cross-cutting operations, either at right angles, with the trackway 77 set and locked by the lever 111 and the scale 101 reading zero or at mitering angles with the scale 101 reading any desired degree, the saw as shown in Fig. 2 being set to cut approximately 30°. The trackway 77 is sufficiently long to permit the saw to be pushed to the rear thereof against the stop 128 before the piece is laid on the table 22 so that the sawing operation is performed by pulling on the grip 175, the operator thus pulling the saw forwardly. It will be observed that such cross cutting operations can be performed either right hand or left hand, that is with the trackway 77 set on either side of its center or right angles or zero degree position. In making such cuts, the table 22 may be adjusted forwardly or rearwardly to accommodate the stroke of the saw to the width of the piece, for example the fence 40 may be disposed in a rearward position for wide pieces so that the stroke of the saw will cut over the entire width of the piece.

Bevel-cut operations may be performed by setting the saw out of the vertical plane as shown in Fig. 4 to either of the notched positions by means of the notches 158 or 159 or to intermediate positions by the degree scale 153 and locked in that position by the handle 149 and such bevel cuts may be made at any of the cross-cut angular positions above mentioned.

To perform rip operations, the trackway 77 may be set at 90° on the scale 101, which will place the plane of the saw parallel to the fence 40 and the width of the cut, from the saw to the fence, may be set by means of the scale 30 by moving the table 22 with its carriage 25 inwardly or outwardly to give the desired reading on the scale 30. For so-called "inside rip" operations, the trackway 77 may be turned clockwise from its normal cross-cut position thus turning the saw toward the rear of the machine. For outside rip operations, the trackway may be turned in the opposite direction to move the saw toward the forward part of the machine, in either case the scale 101 indicating 90° and the saw being parallel to the fence 40. In such positions the yoke 16 is preferably moved to a midway position on the trackway 77 and locked thereat by the lever 126 and the work is moved along under the saw guided by the fence 40. Bevel rip operations may likewise be performed by setting the saw in either of the rip positions and also setting it at an angle on the scale 153.

By rotating the motor to substantially 90° on the scale 153, or to the position of the notch 158, the saw may perform grooving operations in vertical portions of pieces of work.

In any of the positions above referred to, or other positions into which the substantially universal movement of the saw permits, tools other than the saw 136 such as dado cutters, molding cutters etc. may be employed in a manner that will be understood.

By disposing the axis, around which the trackway 77 swings, over the table 22 and by constructing the table 22 to permit its movement forwardly and rearwardly under the saw, the maximum width of cuts is possible both right hand and the left hand.

With the saw in any of the cross-cutting or ripping positions, it can be raised or lowered by unlocking the head 51 by the lever 72 and turning the crank handle 75. Thus the saw may be lowered sufficiently to cut into the top of the table 22 to completely sever the work piece; or the saw may be adjusted to a position above the table top to perform various known operations cutting only partly through the piece.

In Fig. 1 I have indicated at 176 a saw guard, not shown in the other figures. The guard may be of any known or suitable construction to shield the saw and dispose of sawdust through a conduit portion 177. Preferably the saw guard is secured to the housing 134 of the motor and inasmuch as the guard forms no essential part of my invention, it is deemed not necessary to describe it furthermore herein.

The construction above described permits of manufacturing the parts to a high degree of accuracy and the adjustments above described permit of assembling the parts so as to dispose the same in highly accurate relative positions resulting in work of a high degree of accuracy and uniformity.

The construction also permits of a high degree of rigidity and freedom from lost motion which not only adds to the accuracy of the work which may be produced but reduces the necessary motor power therefor permitting a greater output for the same size of machine and material used therein.

My invention is not limited to the exact details of construction shown and described. Many changes therein and modifications thereof may be made without departing from the spirit of my invention or sacrificing its advantages.

I claim:

1. In a sawing machine, a base, a work supporting table on the base, an arm supported by the base and extending over the table, a trackway mounted on the arm and adapted to swing relative to the arm on an axis at right angles to the trackway, a carrier reciprocable on the trackway, and a motor-driven saw blade on the carrier.

2. In a sawing machine, a base, a work supporting table adjustably slidably mounted on the base, an arm supported by the base and extending over the table, a trackway substantially parallel to the table and mounted on the arm to adjustably swing thereon on an axis at right angles to the table, the axis being disposed intermediate the ends of the trackway, a carrier operatively reciprocable on the trackway and a motor-driven saw on the carrier.

3. In a sawing machine, a base, a substantially horizontal work table adjustably reciprocably mounted on the base, an arm supported by the base and extending over the table, a substantially horizontal trackway mounted on the arm to adjustably swing on a substantially vertical axis disposed intermediate the ends of the trackway, a carrier operatively reciprocable on the trackway and a motor-driven saw on the carrier, the saw being adjustably movable around an axis substantially parallel to the trackway.

4. In a sawing machine, a base, a work supporting table on the base, an arm supported by the base and extending over the table, a trackway mounted on the arm to adjustably swing thereon on an axis at right angles to the table, the axis being disposed intermediate the ends of the trackway, a carrier operatively reciprocable on the trackway, a motor-driven saw on the carrier and operable means for raising and lowering the arm relative to the base.

5. In a machine of the class described, a base, a generally horizontal work supporting table on the base, a column on the base, a head generally vertically movable on the column, operable means to adjustably raise and lower the head on the column, operable means to lock the head rigidly on the column at any adjusted position thereon, an arm on the head extending over the table, a stem supported by the arm and adapted to be adjustably rotated thereon on a generally vertical axis, a generally horizontal trackway supported on the stem and rotatable therewith in a plane substantially parallel to the table, operable means for locking the stem against rotation in any adjusted rotary position, a carriage operatively reciprocable on the trackway, operable means to optionally lock the carriage on the trackway, a motor comprising a rotor shaft supported on the carriage and adjustably rotatable thereon about an axis substantially parallel to the trackway, operable means for locking the motor in any adjusted position, and a saw blade on the rotary shaft.

6. In a machine of the class described, a base, a generally horizontal work supporting table on the base, a column on the base, a head generally vertically movable on the column, operable means to adjustably raise and lower the head on the column, operable means to lock the head rigidly on the column at any adjusted position thereon, an arm on the head extending over the table, a stem supported by the arm and adapted to be adjustably rotated thereon on a generally vertical axis, a generally horizontal trackway supported on the stem and rotatable therewith in a plane substantially parallel to the table, operable means for locking the stem against rotation in any adjusted rotary position, a carriage operatively reciprocable on the trackway, operable means to optionally lock the carriage on the trackway, a motor comprising a rotor shaft supported on the carriage and adjustably rotatable thereon about an axis substantially parallel to the trackway, operable means for locking the motor in any adjusted position, and a saw blade on the rotary shaft, the table being provided with a planular work supporting surface and being mounted on the base for reciprocatory movement thereon in directions generally parallel to said surface.

7. In a machine of the class described, a base, an arm over-hanging the base and supported thereby, a substantially horizontal trackway, a substantially vertical upwardly extending rotary bearing stem on the trackway, a rotary bearing for the stem in the arm, an indicating dial scale rotatable with the trackway, a scale pointer on the arm, an operable lock for locking the stem against rotary movement at any scale indicated position of the trackway and a tool support movable on the trackway from side to side of the stem bearing axis.

8. In a machine of the class described, a work supporting base, a support over-hanging the base, a trackway on the support comprising a pair of horizontally spaced slide guideways, a carriage slidable on the guideways comprising a hanger, a motor-driven saw blade supported by the hanger, the hanger being provided with an upwardly open C-form guideway embracing portion, the ends of the C-form portion over-hanging the slide guideways and detachable removable shoe elements connected to the ends of the C-form portion slidable on the guideways and supporting the C-form portion and the hanger.

9. In a machine of the class described, a work supporting base, a support over-hanging the base, a trackway on the support comprising a pair of horizontally spaced slide guideways, a carriage slidable on the guideways comprising a hanger, a motor-driven saw blade supported by the hanger, the hanger being provided with an upwardly open C-form guideway embracing portion, the ends of the C-form portion overhanging the slide guideways and detachable removable shoe elements connected to the ends of the C-form portion slidable on the guideways, supporting the C-form portion and the hanger, and operable locking means for optionally jamming a shoe element upon a guideway for locking the carriage in any pre-selected position on the guideways.

10. In a machine of the class described, a base, a support on the base, a trackway, a generally vertical upwardly extending rotary bearing stem on the trackway, the support being provided with a bearing bore for the stem, a nut screw-threaded on the stem, resting upon the support and supporting the trackway and a tool support movable on the trackway from side to side of the stem axis.

11. In a machine of the class described, a base, a support on the base, a trackway, a generally vertical rotary bearing stem on the trackway, the support being provided with a bearing bore for the stem, a nut screw-threaded on the stem, resting upon the support and supporting the trackway therebelow, the stem being rotatable in the bore to adjustably position the trackway, operable means for jamming the stem in the bore to lock the trackway in any adjusted position and a tool support movable on the trackway from side to side of the stem axis.

12. In a machine tool, a support provided with a bearing bore, an element adjustably rotatable in the bore, the element having a screw-threaded portion extending out of the bore, an axially adjustable nut on the screw-threaded portion, a circular dial centered and supported on the nut a perforation in the dial, a screw projected through the perforation and threaded into the element to clamp the dial upon the nut and to jam the nut threads on the element, a scale on the dial and a stationary pointer on the support cooperating with the scale.

13. In a machine tool, a support provided with a bearing bore, an element adjustably rotatable in the bore, the element having a screw-threaded portion extending out of the bore, an axially adjustable nut on the screw-threaded portion, a circular dial centered and supported on the nut, a perforation in the dial, a screw projected through the perforation and threaded into the element to clamp the dial upon the nut and to jam the nut threads on the element, a scale on the dial and a stationary pointer on the support cooperating with the scale, the said perforation being enlarged relative to the screw to permit circular adjusting movement of the dial relative to the element.

14. In a sawing machine, a base, a work supporting table on the base, an arm supported by the base and extending over the table, a trackway substantially parallel to the table and mounted on the arm to adjustably swing thereon on an axis at right angles to the table, and a carrier operatively reciprocable on the trackway and a motor driven saw on the carrier.

15. In a sawing machine, a base, a work supporting table on the base, an arm supported by the base and extending over the table, operable means for raising and lowering the arm relative to the base, a trackway mounted on the arm and adapted to swing relative to the arm on an axis at right angles to the trackway, a carrier reciprocable on the trackway, and a motor-driven saw blade on the carrier.

16. In a sawing machine, a base, a work supporting table on the base, an arm supported by the base and extending over the table, a trackway mounted on the arm to swing relative to the arm on an axis at right angles to the trackway, a carrier reciprocable on the trackway, a motor-driven saw blade on the carrier, means associated with the trackway and arm to indicate relative rotative positions of the trackway and arm, said means comprising an indicating dial associated with one of said members, a scale pointer on the other of said members, and an operable lock for locking the trackway against rotary movement at any indicated scale position.

17. In a machine of the class described, a base, an arm supported by the base and overhanging the base, a substantially horizontal trackway, a substantially vertical upwardly extending rotary bearing stem on the trackway, a rotary bearing for the stem in the arm, a tool support movable on the trackway from side to side of the stem axis, and means associated with the bearing stem and bearing on the arm to support the trackway.

18. In a machine of the class described, a work supporting base, a column extending upwardly from the base, a head supported by the column and having an arm overhanging the base, a motor driven saw supported by the arm, operable means to adjustably raise and lower the head on the column, said means comprising a screw and a nut meshed therewith mounted on the head and base and positioned adjacent the column, and having working clearances permitting limited rotative movement of the head on the column, means to return the head from any rotated position to a predetermined position and to secure said head fixedly in said predetermined rotated relation to the column, said means comprising a wedge shaped keyway in the column, a wedge shaped key on the head, and means associated with said key to jam the key into the keyway.

RALPH R. ROEMER.